(12) United States Patent
Whyte (10) Patent No.: US 11,455,369 B1
(45) Date of Patent: Sep. 27, 2022

(54) STREAMING FFT WITH BYPASS FUNCTION

(71) Applicant: XILINX, INC., San Jose, CA (US)

(72) Inventor: Andrew Whyte, Edinburgh (GB)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/169,072

(22) Filed: Feb. 5, 2021

(51) Int. Cl.
*G06F 17/14* (2006.01)

(52) U.S. Cl.
CPC .................. *G06F 17/142* (2013.01)

(58) Field of Classification Search
CPC .................................................. G06F 17/142
USPC ....................................................... 708/404
See application file for complete search history.

(56) References Cited

U.S. PATENT DOCUMENTS

| 8,356,064 B1* | 1/2013 | Chen ...................... G06F 17/142 |
| | | 708/404 |
| 2007/0288542 A1* | 12/2007 | Shih .................... H04L 27/2628 |
| | | 708/409 |

OTHER PUBLICATIONS

Xilinx, "Fast Fourier Transform v9.1 LogiCORE IP Product Guide," Vivado Design Suite, PG109 Jan. 21, 2021, 98 pages, Xilinx, Inc. San Jose, California, USA, retrieved from https://www.xilinx.com/support/documentation/ip_documentation/xfft/v9_1/pg109-xfft.pdf.
Polychronakis, N., et al., "A Continuous-Flow, Variable-Length Fft Sdf Architecture," 2010 17th IEEE International Conference on Electronics, Circuits and Systems, Athens, 2010, pp. 730-733.
He, S., et al., "A New Approach to Pipeline FFT Processor," Proceedings of International Conference on Parallel Processing, Honolulu, HI, USA, 1996, pp. 766-770.

* cited by examiner

*Primary Examiner* — Allen C Wong
(74) *Attorney, Agent, or Firm* — Patterson + Sheridan, LLP (57) ABSTRACT

Embodiments herein describe an FFT that can bypass one or more stages when processing smaller frames. For example, when all the stages in the FFT are active, the FFT can process up to a maximum supported point size. However, the particular application may only every send smaller sized frames to the FFT. Instead of unnecessarily passing these frames through the beginning stages of the FFT (which adds latency and consumes power), the embodiments herein can bypass the unneeded stages which reduces the maximum point size the FFT can process but saves power and reduces latency. For example, the FFT can have selection circuitry (e.g., multiplexers) disposed between each stage that permits the input data to either bypass the previous stage(s) or the subsequent stage(s), depending on the architecture of the FFT. The bypassed stages can then be deactivated to conserve power.

20 Claims, 8 Drawing Sheets

STREAMING FFT WITH BYPASS FUNCTION

TECHNICAL FIELD

Examples of the present disclosure generally relate to a streaming fast Fourier transform (FFT) with multiple stages that can be bypassed depending on the maximum point size of the transform it performs.

BACKGROUND

Many applications such as 5G and radar rely on multiple streaming FFTs for data processing. For example, 5G requires multiple FFT processors to enable forward and inverse Fourier transforms for orthogonal frequency-division multiplexing (OFDM) for the various uplink and downlink channels. Often, these FFT processors are implemented in soft logic (e.g., programmable logic) in a field programmable gate array (FPGA) digital front end (DFE) processing chain. Using soft logic enables the designer to generate customized FFTs to perform the exact transforms required by the application.

However, implementing the FFT processors in soft logic requires more space on an IC and often executes slower than implementing those same FFT processors in hard logic. But implementing the FFT processors in hard logic means the designer loses the flexibility to generate customized FFT processors. One balanced approach is to implement the FFT processors in hard logic, but give them the ability to process frames of varying point sizes. For example, the FFT processors may be capable of processing 256-point to 4096-point frames. But when an FFT processor is used to process a data frame less than the maximum supported size (e.g., less than 4096-points), the FFT processor may pass the smaller point size frames through earlier stages without processing the data in these stages. That is, the earlier stages are not needed to perform the smaller point size transform. As a result, an FFT processor that is processing a smaller point size frame has similar latency and power consumption as an FFT processor processing a larger point size frame.

SUMMARY

One embodiment describes a fast Fourier transform (FFT) circuit that includes a plurality of butterfly stages forming a pipeline, each of the plurality of butterfly stages separated from each other by one of a plurality of multiplexers, Moreover, each of the plurality of multiplexers receives as inputs (i) an output from a previous butterfly stage and (ii) input data to be processed by the FFT circuit and, when the previous butterfly stage for a first one of the plurality of multiplexers is bypassed, the first multiplexer is controlled to output the input data to a subsequent butterfly stage. Further, when the previous butterfly stage for the first multiplexer is not bypassed, the first multiplexer is controlled to output the output from the previous butterfly stage.

Another embodiment described herein is an FFT circuit that includes a plurality of butterfly stages forming a pipeline, each of the plurality of butterfly stages separated from each other by one of a plurality of selection circuits. Further, each of the plurality of selection circuits receives data from a previous butterfly stage and selectively outputs the received data to either a subsequent butterfly stage or to an output of the FFT circuit and, when the subsequent butterfly stage for a first one of the plurality of selection circuits is bypassed, the first selection circuit is controlled to output the received data to the output of the FFT circuit. Further, when the subsequent butterfly stage for the first selection circuit is not bypassed, the first selection circuit is controlled to output the received data to the subsequent butterfly stage.

Another embodiment described herein is a method that includes identifying a butterfly stage to bypass in an FFT circuit, the FFT circuit including a plurality of butterfly stages forming a pipeline where each of the plurality of butterfly stages is separated from each other by one of a plurality of selection circuits. The method also includes generating a selection signal for one of the plurality of selection circuits coupled to the identified butterfly stage so that input data received at the FFT circuit bypasses the identified butterfly stage and deactivating at least a portion of the identified butterfly stage.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted. however, that the appended drawings illustrate only typical example implementations and are therefore not to be considered limiting of its scope.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe an FFT that can bypass one or more stages when processing smaller frames to save power and reduce latency. For example, when all the stages in the FFT are active, the FFT can process a maximum supported point size. However, the particular application may send only smaller sized frames to the FFT. Instead of unnecessarily passing these frames through the beginning stages of the FFT (which adds latency and consumes power), the embodiments herein can bypass the unneeded stages which reduces the maximum point size the FFT can process but saves power and reduces latency. For example, the FFT can have selection circuitry (e.g., multiplexers) disposed between each stage that permits the stage to either receive the output of the previous stage or receive the input directly (which bypasses the previous stage or stages) The bypassed stages can then be deactivated to conserve power. In this manner, the FFT has the flexibility to process many different frame sizes while avoiding the latency and power associated with the unused (i.e., bypassed) stages. Further, implementing the FFT in hard logic can be as flexible as implementing the FFTs in soft logic but with the added benefit of requiring less circuit area and potentially faster clock speeds.

Figure 1:
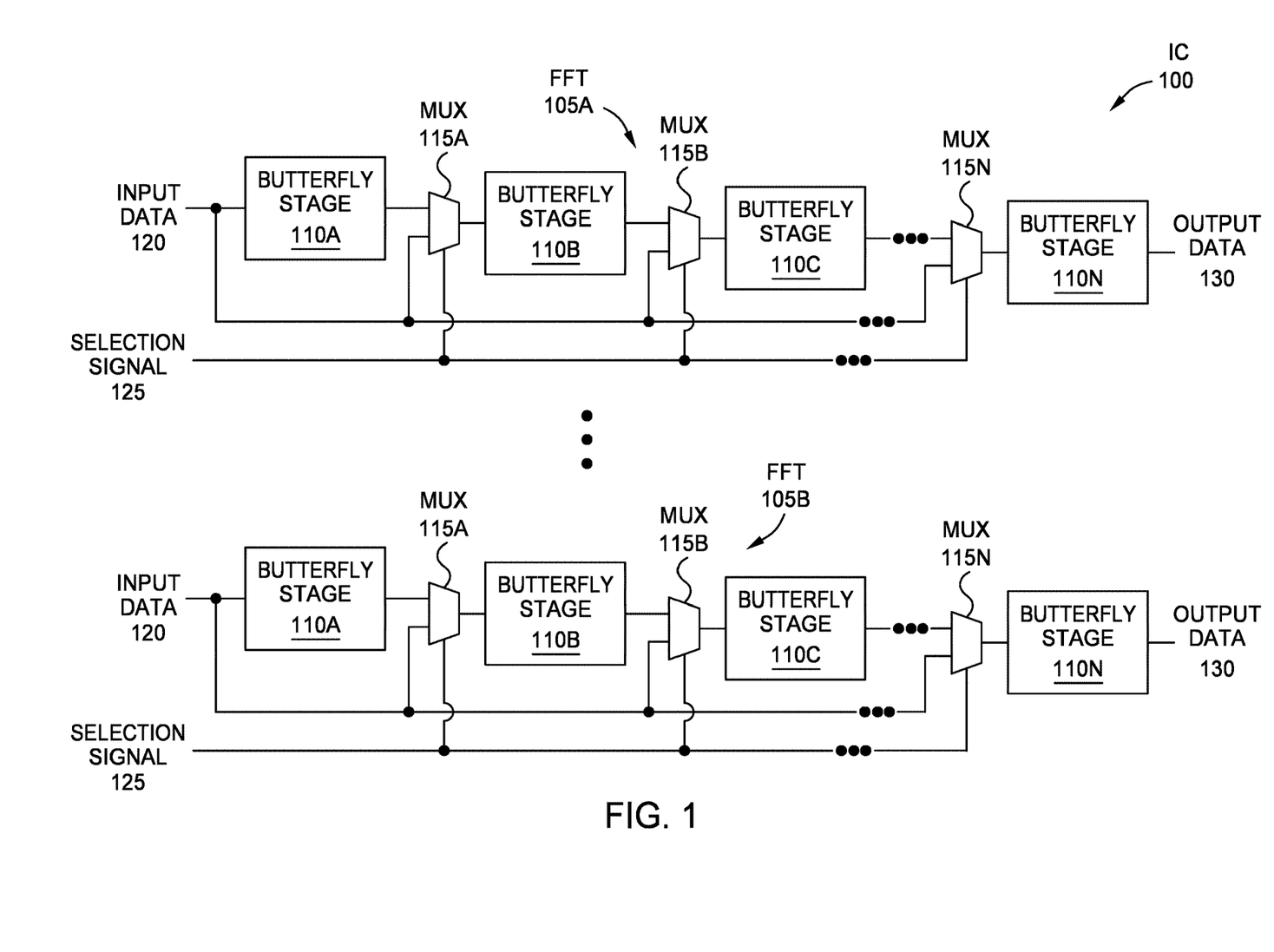
FIG. 1 is a block diagram of an integrated circuit (IC) with multiple FFTs with stages that can be bypassed, according to an example.

FIG. 1 is a block diagram of an IC 100 with multiple FFTs 105 with stages that can be bypassed, according to an example. In one embodiment, the FFTs 105 (also referred to as FFT processors or FFT circuits) are formed using hard logic rather than soft logic (e.g., programmable logic) in the IC 100. As such, the FFTs 105 cannot be reprogrammed to perform other functions besides an FFT. However, the FFTs 105 are flexible in that they can perform a transform on frames with different point sizes. For example, even though the FFTs 105A and 105B may have the same circuit elements (e.g., the same number of butterfly stages 110), during runtime, the FFT 105A may be configured to perform an FFT operation up to a maximum of 256-point frames while the FFT 105B is configured to perform an FFT operation up to a maximum of 4096-point frames. That is, the FFT 105A can process frames that are 256 points or smaller, while the FFT 105B can process frames that are 4096 points or smaller. Further, at a different point of time the FFTs 105 can be reconfigured to transform different maximum sized frames. For example, FFT 105A may be reconfigured to process up to 1024-point frames while the FFT 105B is reconfigured to processes up to 2048-point frames. Thus, the FFTs 105 can be reconfigured to perform a transform on different maximum frame sizes.

Each FFT 105 includes a series of butterfly stages 110 that form a pipeline, where each stage 110 performs at least one butterfly calculation. Further, multiple butterfly stages 110 are separated by multiplexers 115 (or more generally, selection logic) that enables the IC 100 to bypass the previous stage 110 or stages 110. For example, based on a selection signal 125, the mux 115A permits input data 120 to bypass the previous butterfly stage 110A and be inputted directly into the butterfly stage 110B. The mux 115B permits the input data 120 to bypass both butterfly stages 110A and 110B so that the data 120 is input directly into the butterfly stage 110C, and so forth. The number of stages 110 that are bypassed depends on the maximum size of the frames being input into the FFT 105. For example, if none of the stages 110 are bypassed, this means the input data 120 is being processed by each stage (even if the received frame is less than the maximum size currently supported by the FFT 105). This is done when the input data 120 (i.e., the received frames) is the same size as the maximum point size supported by the FFTs 105. For example, if the input data 120 comprises 4096-point frames, and this is the largest frame the FFTs 105 can support, then none of the butterfly stages 110 are bypassed. Stated oppositely, each of the stages 110 process the input data 120. In that case, the selection signal 125 controls the muxes 115 so that each mux outputs the data received from the previous stage 110 to the next stage 110 in the pipeline.

Conversely, if the input data 120 has a frame size that is less than the maximum point size supported by the FFT 105, then one or more of the stages can be bypassed. For instance, if the input data 120 has a frame size of 2048 points (again assuming the maximum point size supported by the FFTs 105 is 4096), then the selection signal 125 controls the mux 115A so that it provides the input data 120 directly to butterfly stage 110B, thereby bypassing butterfly stage 110A. The selection signal 125 also controls muxes 115B-N so these muxes forward the output of the previous stage to the next stage. In this manner, the input data 120 would be processed by butterfly stages 110B-N, thereby avoiding the latency associated with butterfly stage 110A. Moreover, the butterfly stage 110A can be deactivated (e.g., powered down using clock gating) so that the FFT 105A also conserves power by bypassing stage 110A. As such, the FFT 105A can have less latency and consume less power than an FFT that is processing larger frames.

If the input data 120 has a frame size of 1024 points, then the selection signal 125 controls the mux 115B so that it provides the input data 120 directly to butterfly stage 110C, thereby bypassing butterfly stages 110A and 110B. The selection signal 125 also controls the rest of the muxes 115 so they forward the output of the previous stage to the next stage. In this manner, the input data 120 is processed by butterfly stages 110C-N, thereby avoiding the latency associated with butterfly stages 110A and 110B. Moreover, the butterfly stages 110A and 110B can be deactivated. As the point size of the input data 120 shrinks, more and more of the stages 110 in the FFT 105 can be bypassed. Because the input data does not traverse these bypassed stages, this reduces the latency and conserves power since the bypassed stages can be deactivated.

In one embodiment, the FFTs 105 have a mux 115 between each stage 110A-N, which provides the most flexibility. In that case, the FFTs 105 could perform a transform on as small as a 2-point frame. However, since many applications will have a minimum frame size greater than a 2-point frame, the FFTs 105 may not have muxes 115 between the later stages. For example, the FFTs 105 may able to perform, at a minimum, a transform for a 256-point frame. In that case, the butterfly stages performing the last eight ranks of the FFT 105 may not have muxes 115 between them, which may save space and reduce fabrication costs relative to an FFT 105 that has a mux between every stage 110.

While IC 100 illustrates only two FFTs, the IC may have any number of FFTs which can be separately configured to handle different (or the same) sized frames. For example, two FFTs may be configured to process up to 4096-sized frames, one FFT may be configured to process up to 1024-point frames, and four FFTs may be configured to process up to 256-point frames. In one embodiment, the FFTs 105 are pipelined or streaming FFTs so that each stage 110 can process, at the same time, a different portion of the same frame or portions of different frames. In this scenario, the frames are processed in series and may overlap at the stages 110. As such, when processing frames that are equal to, or less than, the maximum point size, the FFTs 105 are continuous in that they can output data at the same rate they receive data without interruptions. That is, the FFTs 105 can receive and process different sized frames continuously so long as these frames are less than the maximum point size the FFT 105 is currently configured to handle.

Further, the embodiments herein can be used with any streaming or pipelined FFT processor or circuit. That is, the embodiments herein can be used with many different FFT algorithms and implementations that have pipelined stages which can be bypassed. Some non-limiting examples include decimation-in-frequency (DIF) FFTs, decimation-in-time (DIT) FFTs, super sample rate (SSR) FFTs, Multi-Path Delay Commutator (MDC) FFTs, Single Delay Feedback (SDF) FFTs, and FFTs that use a mix of radices.

Figure 2:
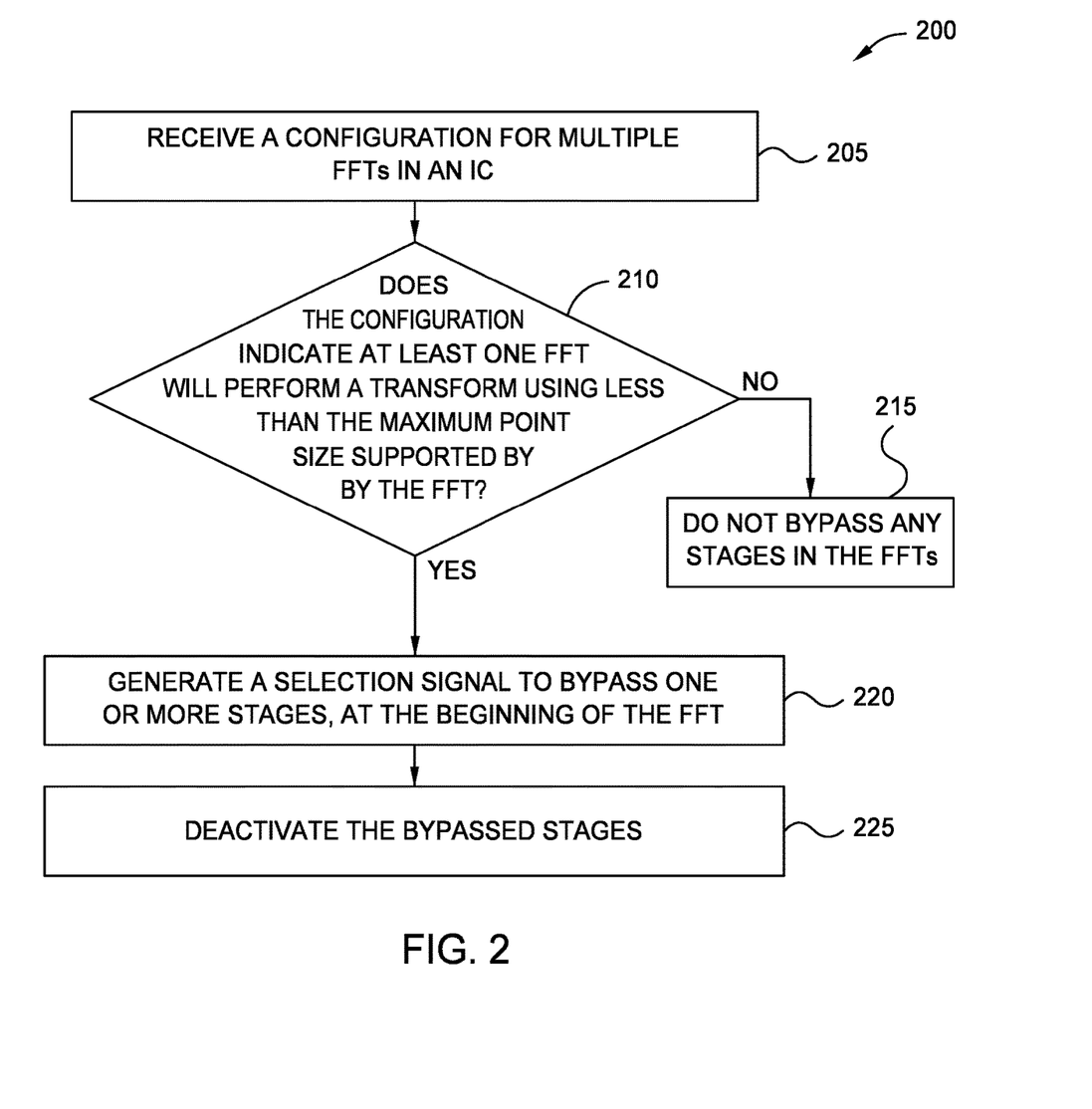
FIG. 2 is a flowchart for bypassing stages in an FFT, according to an example.

FIG. 2 is a flowchart of a method 200 for bypassing stages in an FFT, according to an example. At block 205, the IC receives a configuration for multiple FFTs in the IC. The configuration may be generated by a user or a software application. As described in FIG. 1, the IC 100 can have multiple FFTs which can be the same FFTs or different. For example, each FFT may support the same maximum point size. Alternatively, the IC may have FFTs that support different maximum point sizes (e.g., six FFTs may support up to 4096-point frames while another six FFTs support up to 2048-point frames). Further, the IC can include some FFTs where one or more stages can be bypassed (like the FFTs 105 described in FIG. 1) and other FFTs that do not.

For the FFTs that have stages that can be bypassed, the configuration can indicate the size of frames these FFTs should be configured to receive. That is, the configuration can indicate that some FFTs should be configured to process up to 256-point frames, others should be configured to process up to 1024-point frames, and still others should be configured to process up to 2048-point frames.

At block 210, the IC determines whether the configuration indicates at least one FFT will perform a transform using less than the maximum point size supported by the FFT. For example, the configuration may indicate that one or more FFTs will process 1024-point frames but has enough stages to process up to 4096-point frames.

If no, the method 200 proceeds to block 215 where the IC does not bypass any of the stages in the FFTs. Stated differently, since the configuration in that example indicates that all the FFTs will process frames with the maximum supported point size, then all the stages in the FFTs should be used.

However, if there is at least one FFT that will process frames that are smaller than its maximum supported point size, the method 200 proceeds to block 220 where the IC generates a selection signal to bypass one or more stages at the beginning of the FFT. As described above, the smaller the frames to be processed by the FFT, the more stages that can be bypassed. The selection signal controls the muxes so that the appropriate mux is used to directly transmit the input (i.e., the received frames) to a downstream stage, thereby bypassing the previous stage or stages. Bypassing the stages reduces the amount of time or latency of the FFT relative to an FFT where the input data must pass through all the stages, even if some of the earlier stages do not process or change the data as it passes through the stage.

At block 225, a controller in the IC deactivates the bypassed stages. This may be done to conserve power. In one embodiment, the circuitry in the bypassed stage (e.g., a butterfly stage) is clock gated, which blocks the dock signal from reaching the circuitry in the stage. In another embodiment, the synchronous circuit elements in the stages could receive a clock enable/disable signal which is disabled for bypassed stages but enabled for the stages that are not bypassed. This would prevent synchronous circuit elements like flip flops from toggling when the stage is bypassed. Further, the stages may include memory elements (e.g., random access memory (RAM)) which can be deactivated so they consume less (or no) power.

Figure 3:
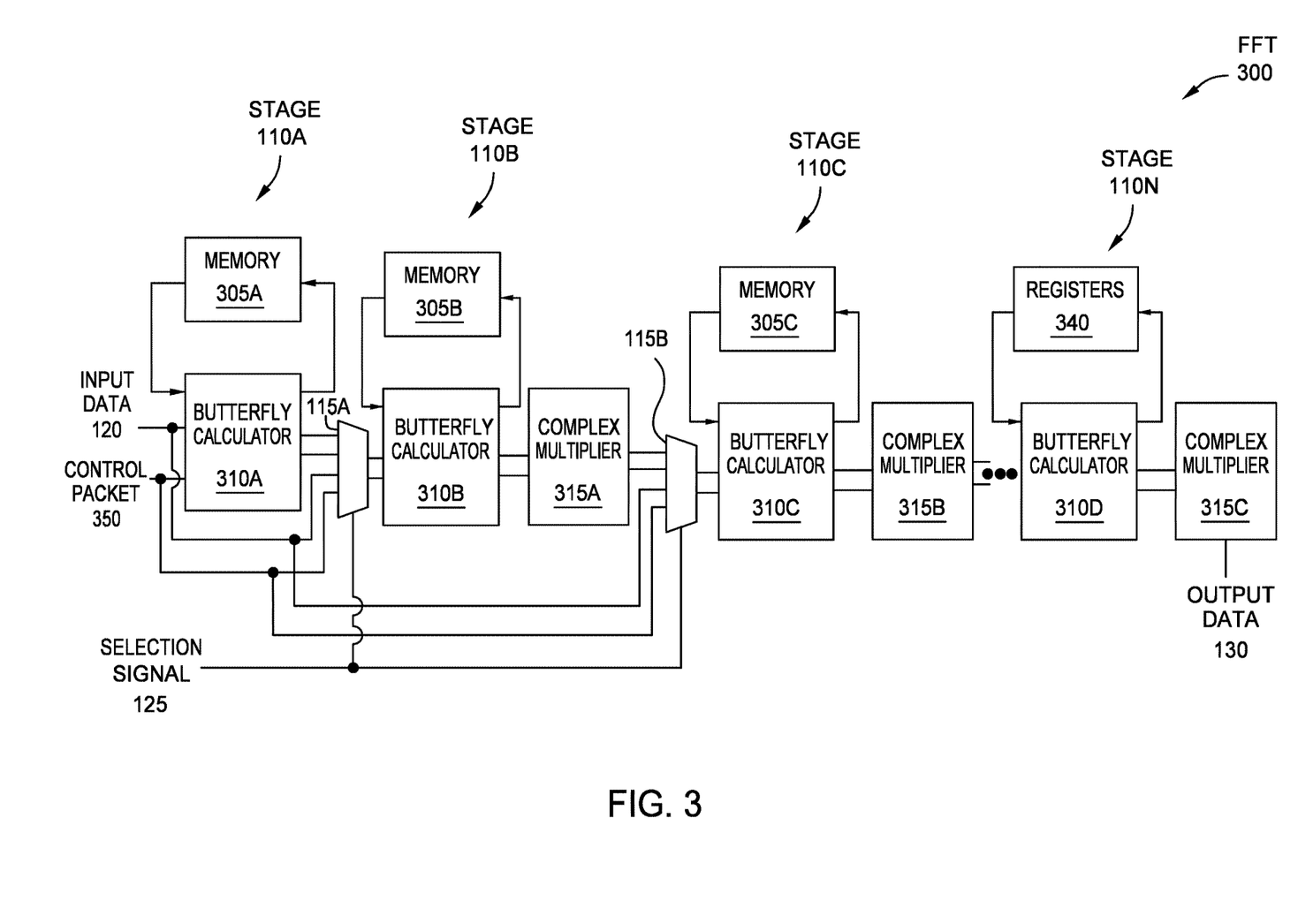
FIG. 3 is a block diagram of an FFT with stages that can be bypassed, according to an example.

FIG. 3 is a block diagram of an FFT 300 with stages 110 that can be bypassed, according to an example. The FFT 300 is one implementation of the FFTs 105 illustrated in FIG. 1. However, the FFT 300 is just one example, and as expressed above, the embodiments herein can be used with any pipelined or streaming FFT.

In this example, the butterfly stage 110A includes a butterfly calculator 310A and a memory 305A (e.g., RAM). The butterfly calculator 310A receives the input data 120 and a control packet 350. The input data 120 can include a stream of frames with different point sizes as discussed above. In one embodiment, the control packet 350 indicates the point size of the frames in the input data 120. As shown, this control packet 350, along with the processed data, is passed to the next stage 110.

In addition to respective butterfly calculators 310, the stages 110B-110N also include complex multipliers 315 that use twiddle factors to apply a rotation to the received samples. Further, a processing engine (PE) that perform different types of butterfly calculations. For example, the FFT 300 may have a radix-2-squared single delay feedback decimation-in-frequency architecture where multiple PEs include the calculators 310B-D for performing type 1 and type 2 butterfly calculations. For instance, one PE may include calculator 310A, 310B, and the complex multiplier 315A.

Like in FIG. 1, the FFT 300 has bypass paths that permit the input data 120 and the control packet 350 to bypass one or more of the stages. For example, the mux 115A permits the input data 120 and control packet 350 to bypass stage 110A, the mux 115B permits this data to bypass stages 110A and 110B, and so forth. In one embodiment, the FFT 300 includes muxes between each stage 110, or in another embodiment, the stages at the end of the FFT 300 may not have muxes between them.

When a stage 110 is bypassed, the circuitry in that stage can be deactivated. For example, if the stages 110A and 110B are bypassed, then the memories 305A and 305B can be deactivated so they consume little to no power. The butterfly calculators 310A and 310B and the complex multiplier 315A can also be deactivated. These deactivations can be performed using clock gating or clock enable/disable signals so that synchronous circuit elements do not toggle.

While FIGS. 1 and 3 illustrate bypassing all the circuitry in the stage (e.g., the memories 305, the butterfly calculators 310, and the complex multipliers 315), in another embodiment, the FFT may bypass only the memories 305 and continue to pass data unaltered through the butterfly calculator 310 and the complex multiplier 315 (if the stage has a complex multiplier 315). In that example, the butterfly calculator 310 and complex multiplier 315 would receive the input data 120 and the control package 350, but they would not process the data (i.e., change the data) and output the data unaltered to the next stage. The data, however, would not be written into the memories 305, which could be deactivated. While bypassing only the memories in the unneeded stages would save power, this design would use more multiplexers than the design in FIG. 3 and incurs toggle power in the circuitry of the butterfly calculator 310 and the complex multiplier 315. In any case, the embodiments include deactivating or bypassing a portion of each stage, rather than deactivating all the circuitry in the bypassed stage.

Figure 4:
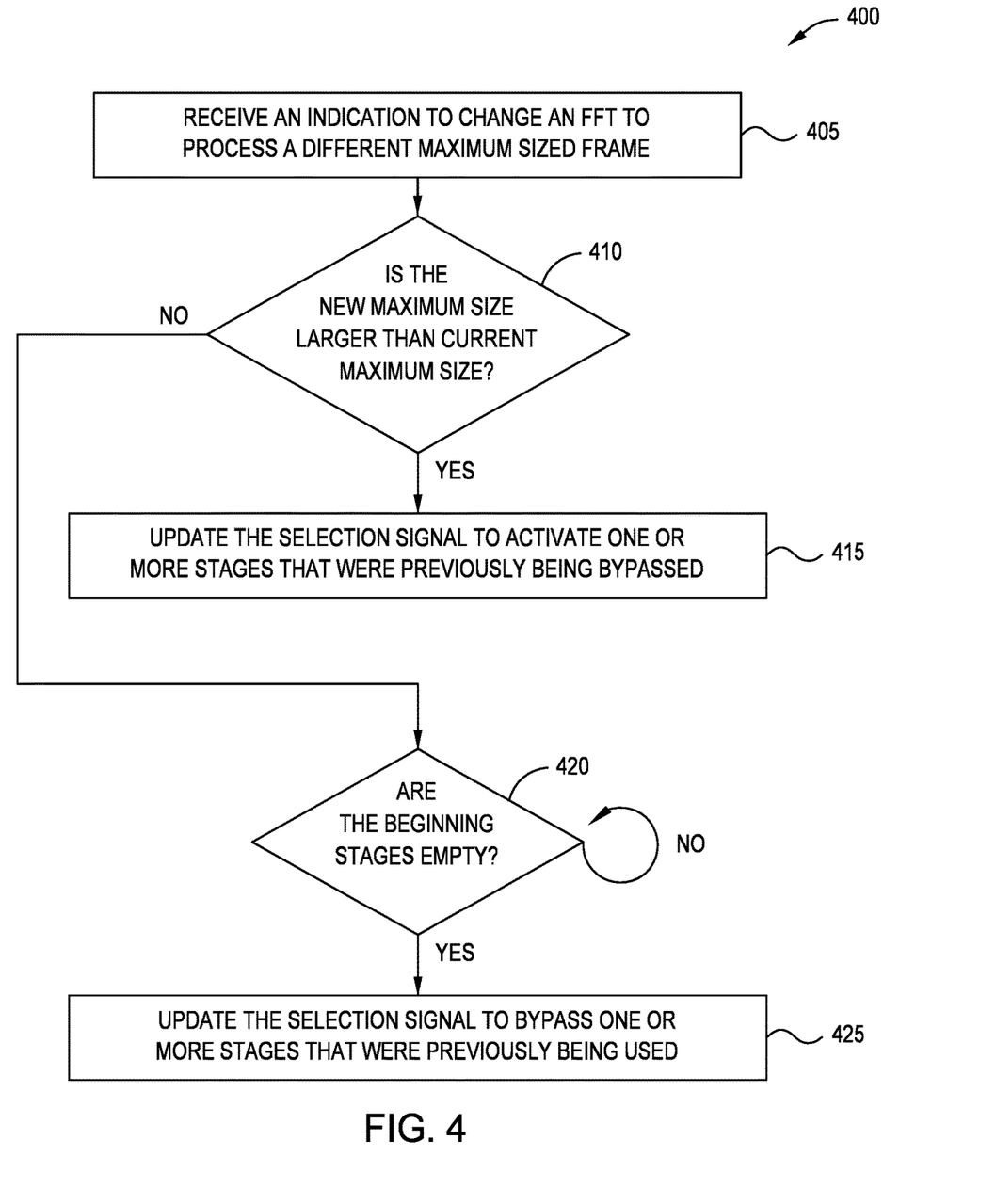
FIG. 4 is a flowchart for dynamically changing an FFT to process different sized frames, according to an example.

FIG. 4 is a flowchart of a method 400 for dynamically changing an FFT to process different maximum sized frames, according to an example. In general, the method 400 can be used to dynamically reconfigure an FFT, on-the-fly, to process different maximum point sized frames. For example, an FFT may currently be processing frames up to a first maximum point size (where the FFT is bypassing one or more stages) but be reconfigured to process frames up to a second, different maximum point size (where the FFT is bypassing more or less stages than it did previously).

At block 405, the IC receives an indication to change an FFT to process a different maximum sized frame. That is, the FFT may currently process frames where it bypasses a first number of stages. Or the FFT may currently process frames where it does not bypass any number of stages—i.e., the maximum supported frame size.

At block 410, the IC determines whether the new maximum size is larger than the current maximum size. Assuming it is, the method 400 proceeds to block 415 where the IC updates the selection signal to activate one or more stages that were previously being bypassed. In one embodiment, this change occurs once the new sized frames are received at the input of the FFT. Moreover, this change can occur continuously where there is no pause or break between the time when the FFT received the frames that were processed using the previous maximum size to when it receives the frames that are processed using the new maximum size. This is because the new frames can be sent to one or more of the stages that were previously being bypassed. For example, if the new maximum point size requires the FFT to use one additional stage that was previously being bypassed, this stage can be reactivated. Because the previous maximum point size did not use this stage, it is currently empty. Thus, once the new frames are received, the IC can change the selection signal so that the frames are input into the previously unused stage. The remaining stages can continue to process and output the old frames. Eventually, the new frames will fill up all the active stages of the FFT.

However, if the new maximum size is smaller than the current maximum size, the method instead proceeds to block 420 where the IC waits until the beginning stages are empty. Because the new maximum size is smaller, this means the FFT needs to bypass one or more stages that may currently be used to process the larger frames. If the FFT immediately switched to processing the new frames, this might mean the old frames that were in the stage (or stages) that are now being bypassed when the FFT processes the new sized frames may be lost or become corrupted. Instead, the IC waits at block 420 until the stages that will be bypassed when processing the new size frames are empty (i.e., the old sized frames processed using the old maximum point size have already progressed to stages that will be used to process the new frames using the new maximum point size). As such, when moving to smaller maximum point size, the IC may have to wait until the stages that are going to be bypassed when processing the new frames are empty. In one embodiment, the FFT may have an activity signal that indicates when a particular stage (or all the stages) in the FFT are empty. The IC may wait until the desired stage(s) (or all the stages) are empty.

Once the stage(s) are empty, at block 425 the IC can update the selection signal to bypass one or more stages that were previously being used. The FFT is then ready to process the frames with the new, smaller size. While this is still considered as reconfiguring the FFT on-the-fly, the FFT may not be continuously processing input data when switching from processing larger sized frames to smaller sized frames. Instead, the FFT may have to wait until the stages that are going to be bypassed have finished processing the old frames, which means the FFT may not process a received frame for one or more clock cycles. In another embodiment, the IC may wait until the FFT is completely idle before updating the selection signal and permitting the FFT to begin processing the frames with the new point size.

As an alternative to blocks 420 and 425, in one embodiment, the controller on the IC blocks or ignores the reduction in maximum point size and flags that to the user with an extra signal. That is, the controller does not reduce the maximum point size without user permission. In that case, the FFT still uses a larger maximum point size than is necessary to process the frames (which may mean the latency and power remains higher than is required), but the dataflow is still continuous.

Figure 5:
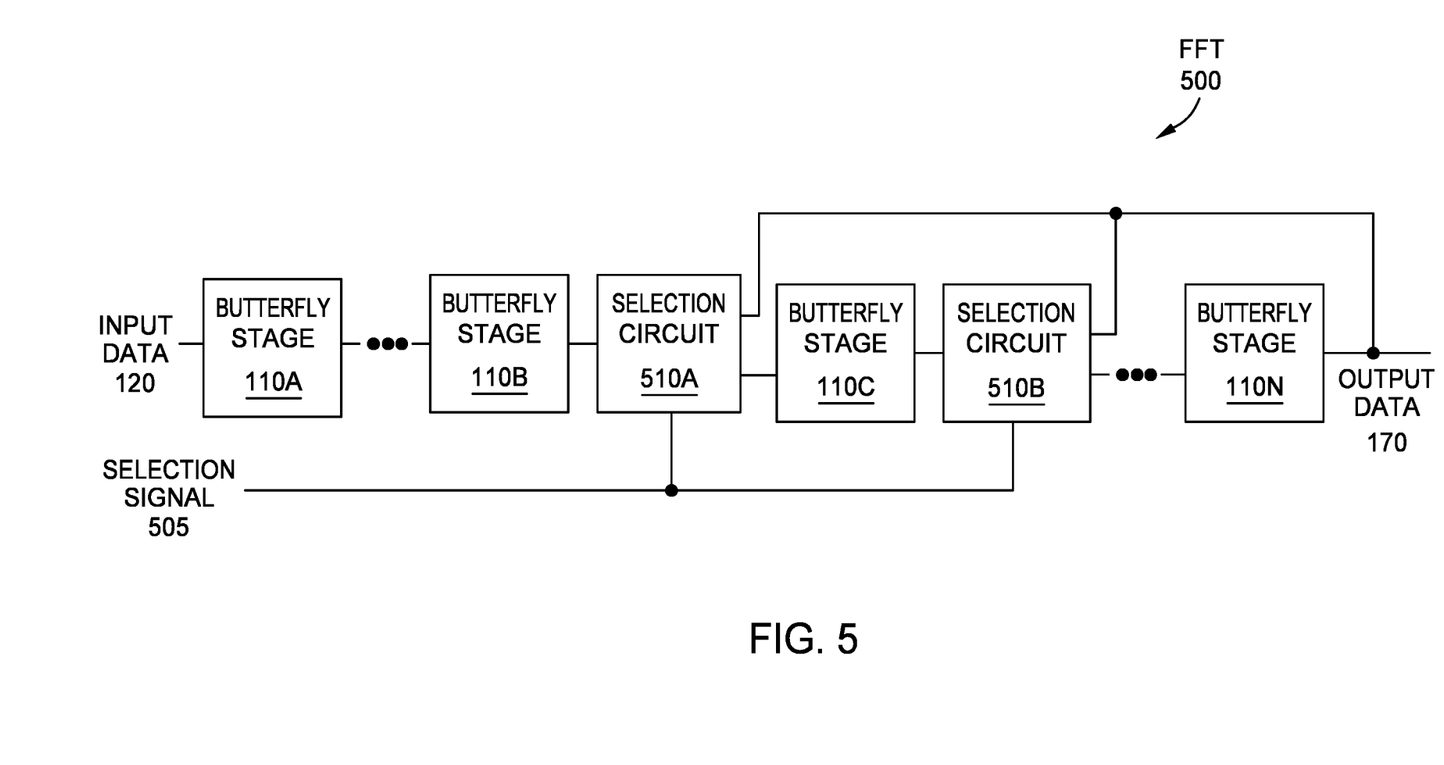
FIG. 5 is a block diagram of an FFT with stages that can be bypassed, according to an example.

FIG. 5 is a block diagram of an FFT 500 with stages that can be bypassed, according to an example. In FIG. 5, the FFT 500 is implemented as a decimation-in-time pipelined architecture, which has the smallest delays at the start of the pipeline formed by the butterfly stages 110 and the largest delay at the end of the pipeline, which is similar to reversing the data flow in FIG. 1. The embodiments herein are still applicable in that case, as selection circuits 510 instead bypass the stages 110 at the end of the pipeline to directly output the data, in contrast to the embodiments above where selection logic (e.g., the multiplexers 115) is used to bypass stages at the beginning of the pipeline.

That is, input data is always received at the first stage 110A which is never bypassed, but one or more of the last stages 110C-110N in the pipeline may be bypassed using the selection circuits 510 and a selection signal 505, depending on the point size of the frames. For example, the smaller the point size of the received frames, the greater number of the butterfly stages 110C-N at the end of the pipeline that can be bypassed. To bypass the stages 110, the output of the previous selection circuit 510 is sent directly to the output of the FFT 500 using a bypass path rather than being transmitted into the subsequent stage(s) 110 (i.e., the bypassed stage(s)). Like above, bypassing the stages reduces latency relative to FFTs that still transmit the data through the remaining stages in the pipeline even though this is unnecessary. Like in the embodiments above, the bypassed stages 110 can be deactivated to conserve power.

Figure 6A:
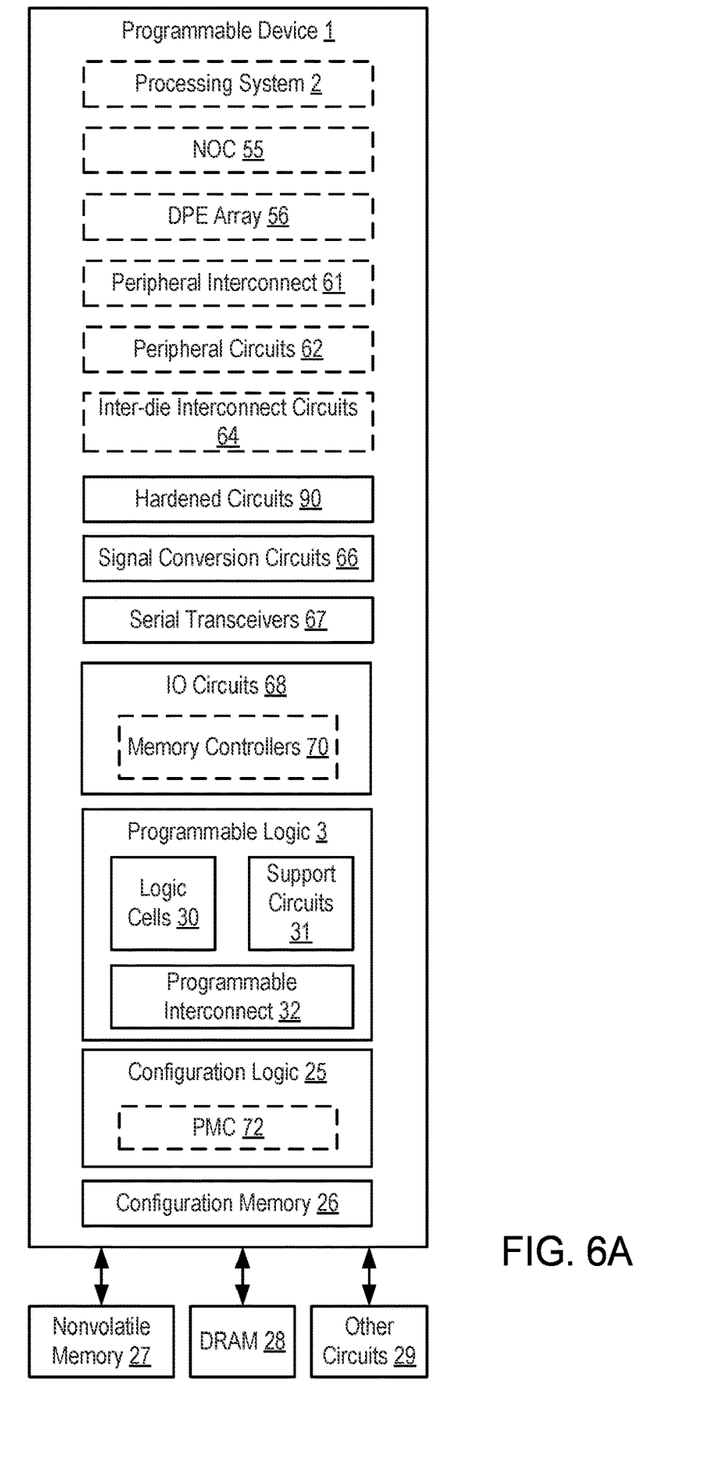
FIG. 6A is a block diagram depicting a programmable IC according to an example.

FIG. 6A is a block diagram depicting a programmable device 1 according to an example. The programmable device 1 includes programmable logic (PL) 3 (also referred to as a programmable fabric), input/output (IO) circuits 68, serial transceivers 67, signal conversion circuits 66 hardened circuits 90, configuration logic 25, and configuration memory 26. The programmable device 1 can be coupled to external circuits, such as nonvolatile memory 27, dynamic random access memory (DRAM) 28, and other circuits 29. In various examples, the programmable device 1 further includes a processing system (PS) 2, a network-on-chip (NOC) 55, a data processing engine (DPE) array 56, peripheral interconnect 61, peripheral circuits 62 and inter-die interconnect circuits 64.

The PL 3 includes logic cells 30, support circuits 31, and programmable interconnect 32. The logic cells 30 include circuits that can be configured to implement general logic functions of a plurality of inputs. The support circuits 31 include dedicated circuits, such as digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 27 or any other source (e.g., the DRAM 28 or from the other circuits 29). In some examples, the configuration logic 25 includes a platform management controller (PMC) 72. The PMC 72 is configured to boot and configure the subsystems of the programmable device 1, such as the PL 3, the PS 2, the NoC 55, the DPE array 56, the signal conversion circuits 66, the hardened circuits 90, and the like.

The IO circuits 68 provide an external interface for the subsystems of the programmable device 1, such as the PL 3, the PS 2, and the like. In some examples, the IO circuits 68 include memory controllers 70 configured to interface external memories (e.g., the DRAM 28). Other connectivity circuits can include the peripheral interconnect 61, the peripheral circuits 62, and the inter-die interconnect circuits 64. The peripheral interconnect 61 includes bus interface circuits, such as peripheral component interconnect express (PCIe) circuits and the like. The peripheral circuits 62 include universal serial bus (USB) ports, Ethernet ports, universal asynchronous transceiver (UART) ports, serial peripheral interface (SPI) ports, general purpose IO (GPIO) ports, serial advanced technology attachment (SATA) ports, and the like. The inter-die interconnect circuits 64 include circuits configured to interface like inter-die interconnect circuits in other programmable device(s) (e.g., for when the programmable device 1 is one die in a multi-die integrated circuit package). The serial transceivers 67 include high-speed transmit/receive circuits configured to provide an external IO interface for the programmable device 1.

The PS 2 can include microprocessor(s), memory, support circuits, IO circuits, and the like. The NOC 55 is configured to provide for communication between subsystems of the programmable device 1, such as between the PS 2, the PL 3, the hardened circuits 90, and the DPE array 56. The DPE array 56 can include an array of DPE's configured to perform data processing, such as an array of vector processors. The signal conversion circuits 66 include analog-to-digital converters (ADCs) and digital-to-analog converters (DACs).

The hardened circuits 90 comprise circuits with predetermined functionality. A given hardened circuit 90 can include one or more predetermined functions. Example hardened circuits 90 include filters, mixers, sample-rate converters, transforms circuits (e.g., Fast-Fourier Transform (FFT)), and the like. For example, the hardened circuits 90 may include the FFT circuits discussed above in FIGS. 1-5. A hardened circuit 90 can be programmable to configure specific predetermined functionalities or select among predetermined functionalities. However, in contrast to a circuit in the PL 3, a hardened circuit 90 cannot be configured or reconfigured with different functionality. For example, a hardened circuit 90 can include a filter having two predetermined and selectable functionalities. A third functionality cannot be added to the hardened circuit 90, nor can one of the two functionalities be removed from the hardened circuit 90. In contrast, a filter configured in the PL 3 can be reconfigured to add one more additional functionalities or to remove one or more functionalities. Further, a filter configured in the PL 3 can be removed entirely and replaced with another circuit. In contrast, a hardened circuit 90 cannot be removed from the programmable device 1 (but can be unused if desired).

Figure 6B:
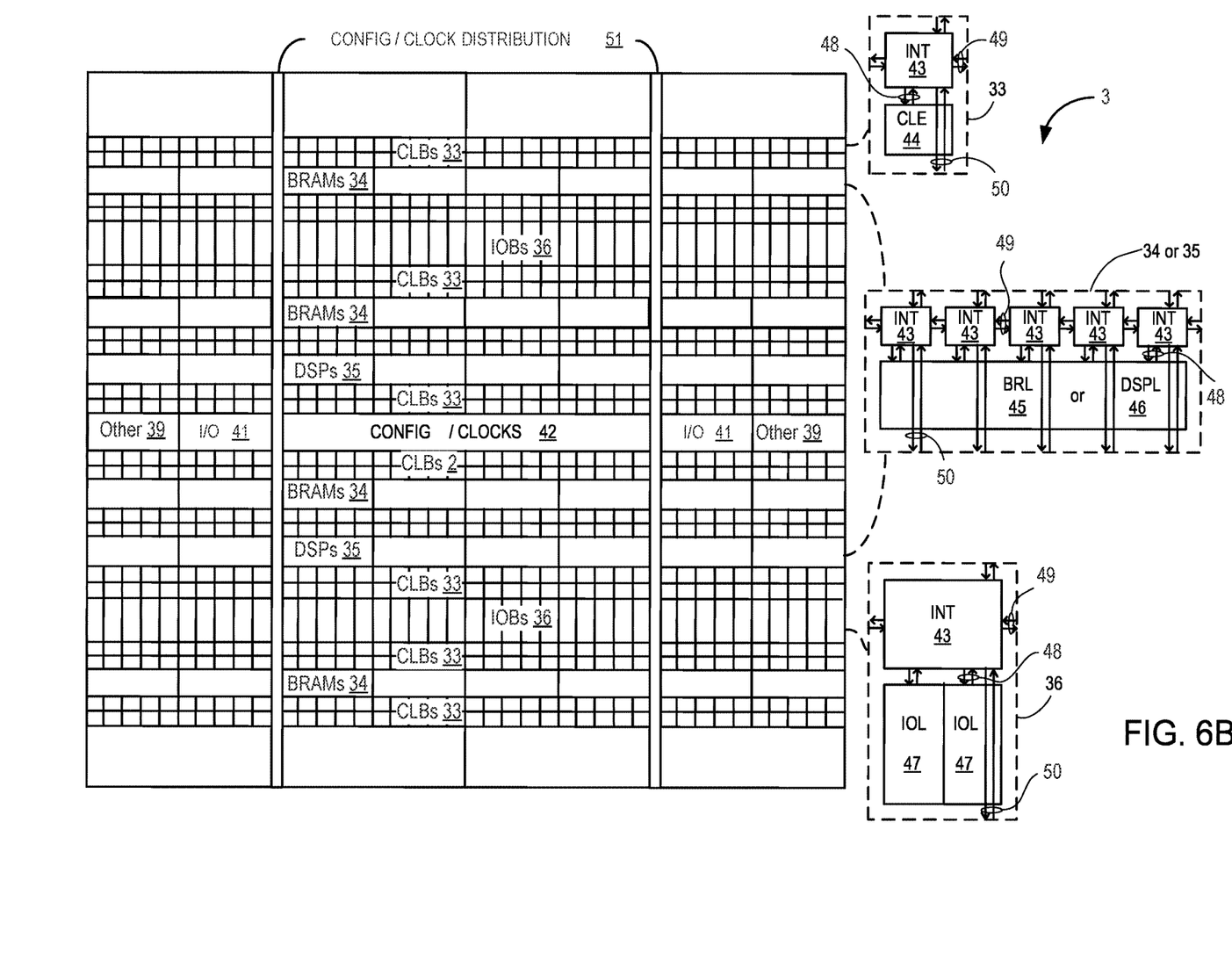
FIG. 6B illustrates a field programmable gate array (FPGA) implementation of a programmable IC according to an example.

FIG. 6B illustrates a field programmable gate array (FPGA) implementation of the PL 3 according to an example. The PL 3 shown in FIG. 6B can be used in any example of the programmable devices described herein. The PL 3 includes a large number of different programmable tiles including configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital dock managers, analog-to-digital converters, system monitoring logic, and so forth.

In some PLs, each programmable tile can include at least one programmable interconnect element ("INT") 43 having connections to input and output terminals 48 of a programmable logic element within the same tile, as shown by examples included at the top of FIG. 6B. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated PL.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements (which can include the FFT circuits in FIGS. 1-5). An IOB 36 can include, for example, two instances of an input/output logic element ("IOL") 47 in addition to one instance of the programmable interconnect element 43. As will be dear to those of skill in the art, the actual I/O pads connected, for example, to the I/O logic element 47 typically are not confined to the area of the input/output logic element 47.

In the pictured example, a horizontal area near the center of the die (shown in FIG. 6B) is used for configuration, dock, and other control logic. Vertical columns 51 extending from this horizontal area or column are used to distribute the clocks and configuration signals across the breadth of the PL.

Some PLs utilizing the architecture illustrated in FIG. 6B include additional logic blocks that disrupt the regular columnar structure making up a large part of the PL. The additional logic blocks can be programmable blocks and/or dedicated logic.

Note that FIG. 6B is intended to illustrate only an exemplary PL architecture. For example, the numbers of logic blocks in a row, the relative width of the rows, the number and order of rows, the types of logic blocks included in the rows, the relative sizes of the logic blocks, and the interconnect/logic implementations included at the top of FIG. 6B are purely exemplary. For example, in an actual PL more than one adjacent row of CLBs is typically included wherever the CLBs appear, to facilitate the efficient implementation of user logic, but the number of adjacent CLB rows varies with the overall size of the PL.

Figure 6C:
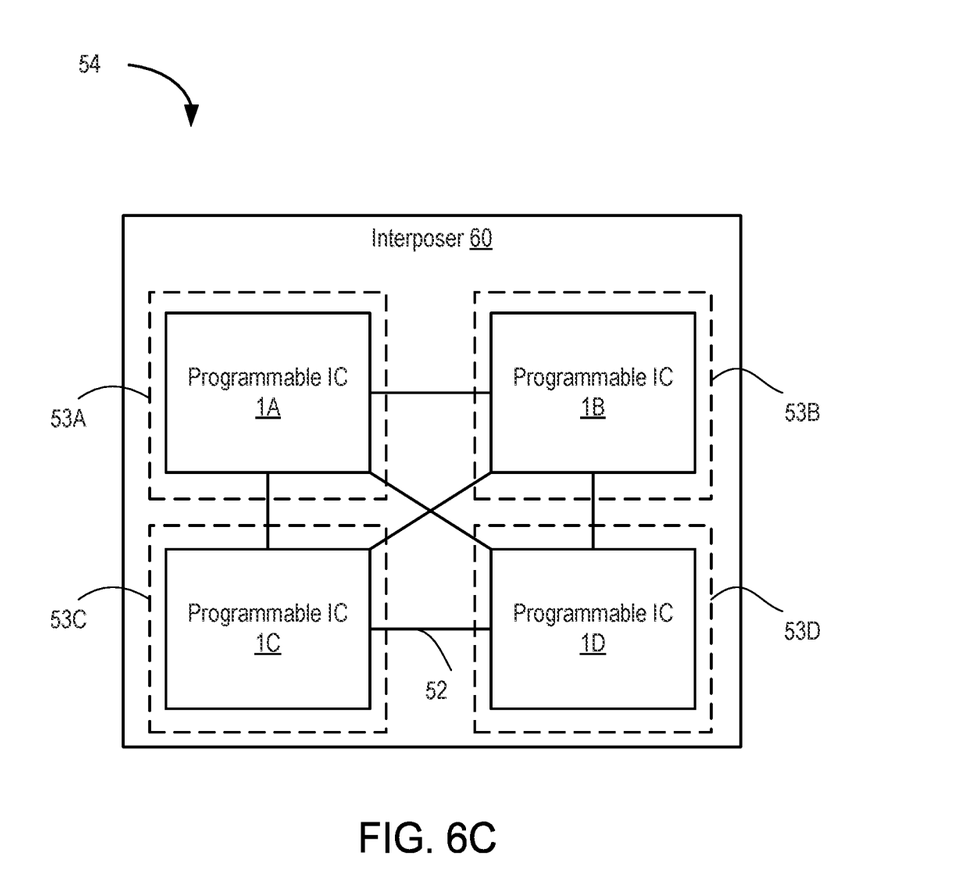
FIG. 6C is a block diagram depicting a multi-integrated circuit (IC) programmable device according to an example.

FIG. 6C is a block diagram depicting a multi-die programmable device 54 according to an example. The multi-die programmable device 54 includes a plurality of programmable devices 1, e.g., programmable devices 1A, 1B, 1C, and 1D. In an example, each programmable device 1 is an IC die disposed on an interposer 60. Each programmable device 1 comprises a super logic region (SLR) 53 of the programmable device 54, e.g., SLRs 53A, 53B, 53C, and 53D. The programmable devices 1 are interconnected through conductors on the interposer 60 (referred to as super long lines (SLLs) 52) and inter-die interconnect circuits 64 disposed within each of the programmable devices 1. The programmable ICs could include hardened portions that include the FFT circuits described above in FIGS. 6A-6C.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved, It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A fast Fourier transform (FFT) circuit, comprising:
a plurality of butterfly stages forming a pipeline, each of the plurality of butterfly stages separated from each other by one of a plurality of multiplexers,
wherein each of the plurality of multiplexers receives as inputs (i) an output from a previous butterfly stage and (ii) input data to be processed by the FFT circuit,
wherein, when the previous butterfly stage for a first one of the plurality of multiplexers is bypassed, the first multiplexer is controlled to output the input data to a subsequent butterfly stage, and
wherein, when the previous butterfly stage for the first multiplexer is not bypassed, the first multiplexer is controlled to output the output from the previous butterfly stage.

2. The FFT circuit of claim 1, wherein, when the previous butterfly stage for the first multiplexer is bypassed, circuitry in the previous butterfly stage is deactivated.

3. The FFT circuit of claim 2, wherein deactivating the previous butterfly stage comprises deactivating a memory element in the previous butterfly stage such that the memory element consumes little to no power.

4. The FFT circuit of claim 2, wherein deactivating the previous butterfly stage comprises deactivating a butterfly calculator and a complex multiplier in the previous butterfly stage.

5. The FFT circuit of claim 1, wherein, when multiple, sequential butterfly stages of the plurality of butterfly stages are bypassed, a second multiplexer of the plurality of multiplexers that is connected to an output of a last stage in the multiple, sequential butterfly stages is controlled to output the input data, wherein the input data does not pass through the multiple, sequential butterfly stages.

6. The FFT circuit of claim 1, further comprising:
a second plurality of butterfly stages forming a part of the pipeline, wherein the second plurality of butterfly stages are not separated from each other by multiplexers.

7. The FFT circuit of claim 1, wherein the plurality of butterfly stages and the plurality of multiplexers are implemented using hard logic in an integrated circuit.

8. A fast Fourier transform (FFT) circuit, comprising:
a plurality of butterfly stages forming a pipeline, each of the plurality of butterfly stages separated from each other by one of a plurality of selection circuits,
wherein each of the plurality of selection circuits receives data from a previous butterfly stage and selectively outputs the received data to either a subsequent butterfly stage or to an output of the FFT circuit,
wherein, when the subsequent butterfly stage for a first one of the plurality of selection circuits is bypassed, the first selection circuit is controlled to output the received data to the output of the FFT circuit, and
wherein, when the subsequent butterfly stage for the first selection circuit is not bypassed, the first selection circuit is controlled to output the received data to the subsequent butterfly stage.

9. The FFT circuit of claim 8, wherein, when the subsequent butterfly stage for the first selection circuit is bypassed, circuitry in the subsequent butterfly stage is deactivated.

10. The FFT circuit of claim 9, wherein deactivating the subsequent butterfly stage comprises deactivating a memory element in the subsequent butterfly stage such that the memory element consumes little to no power.

11. The FFT circuit of claim 9, wherein deactivating the subsequent butterfly stage comprises deactivating a butterfly calculator and a complex multiplier in the subsequent butterfly stage.

12. The FFT circuit of claim 8, wherein, when multiple, sequential butterfly stages of the plurality of butterfly stages are bypassed, a second selection circuit of the plurality of selection circuits that is connected to an input of a first stage in the multiple, sequential butterfly stages is controlled to output its received data to the output of the FFT circuit, wherein the received data of the second selection circuit does not pass through the multiple, sequential butterfly stages.

13. The FFT circuit of claim 8, further comprising:
a second plurality of butterfly stages forming a beginning part of the pipeline, wherein the second plurality of butterfly stages is not separated from each other by selection circuits.

14. The FFT circuit of claim 8, wherein the plurality of butterfly stages and the plurality of selection circuits are implemented using hard logic in an integrated circuit.

15. A method, comprising:
identifying a butterfly stage to bypass in a fast Fourier Transform (FFT) circuit, the FFT circuit comprising a plurality of butterfly stages forming a pipeline, wherein each of the plurality of butterfly stages is separated from each other by one of a plurality of selection circuits;
generating a selection signal for one of the plurality of selection circuits coupled to the identified butterfly stage so that input data received at the FFT circuit bypasses the identified butterfly stage; and
deactivating at least a portion of the identified butterfly stage.

16. The method of claim 15, wherein deactivating the identified butterfly stage comprise deactivating a memory element in the identified butterfly stage such that the memory element consumes little to no power.

17. The method of claim 16, wherein identifying the butterfly stage to bypass comprises:
identifying multiple, sequential butterfly stages of the plurality of butterfly stages to bypass.

18. The method of claim 17, wherein generating the selection signal for one of the plurality of selection circuits comprises:
generating the selection signal to bypass all of the multiple, sequential butterfly stages such that input data received at the FFT circuit does not pass through any of the multiple, sequential butterfly stages.

19. The method of claim 15, wherein deactivating the identified butterfly stage comprises deactivating a butterfly calculator and a complex multiplier in the identified butterfly stage.

20. The method of claim 15, wherein the plurality of butterfly stages and the plurality of selection circuits are implemented using hard logic in an integrated circuit.

\* \* \* \* \*

UNITED STATES PATENT AND TRADEMARK OFFICE
CERTIFICATE OF CORRECTION

PATENT NO. : 11,455,369 B1
APPLICATION NO. : 17/169072
DATED : September 27, 2022
INVENTOR(S) : Andrew Whyte It is certified that error appears in the above-identified patent and that said Letters Patent is hereby corrected as shown below:

In the Specification

Column 5, Line 36, Delete "ail" and insert -- all --, therefor.

Column 5, Line 56, Delete "dock" and insert -- clock --, therefor.

Column 10, Line 4, Delete "dock" and insert -- clock --, therefor.

Column 10, Line 47, Delete "dock" and insert -- clock --, therefor.

In the Claims

Column 13, Line 60, In Claim 8, delete "transform" and insert -- Transform --, therefor.

Signed and Sealed this
Twenty-eighth Day of February, 2023

Katherine Kelly Vidal
*Director of the United States Patent and Trademark Office*